3,379,767
PROCESS FOR THE HYDROGENATION OF OLEFIN POLYMERS IN CUMENE

Bernard A. Kreiter, Media, and John V. Ward, Oakmont, Pa., assignors to Gulf Oil Corporation, Pittsburgh, Pa., a corporation of Pennsylvania
No Drawing. Filed July 7, 1964, Ser. No. 380,938
8 Claims. (Cl. 260—593)

ABSTRACT OF THE DISCLOSURE

Impure cumene containing olefin polymers is passed through a palladium on alumina catalyst bed in the presence of hydrogen at 100° to 300° F. whereby said olefin polymers are saturated. The cumene thus produced is suitable for oxidation to acetone and phenol via decomposition of cumene hydroperoxide.

---

This invention relates to a process for purifying cumene.

Benzene can be alkylated with propylene to form cumene. Thus, a mixture of benzene and propylene can be passed over a suitable catalyst, such as phosphoric acid on kieselguhr, wherein, for example, the amount of phosphoric acid on kieselguhr can be from about 50 to about 90 percent by weight thereof, at a space velocity (volume of reactants/volume of catalyst/hour) of about 0.5 to about 2.0 while maintaining a temperature of about 350° to about 450° F. and a pressure of about 300 to about 700 pounds per square inch gauge in the reaction system. However, the propylene stream employed contains not only propylene but may in some cases contain propadiene and some $C_2$ and $C_4$ olefins. Accordingly, during the alkylation defined above, propadiene reacts with benzene to form alpha methyl styrene and the $C_2$ and $C_4$ olefins react with benzene to form variously alkylated benzenes. At the same time some olefin polymerization occurs and some $C_6$, $C_7$, $C_9$, $C_{10}$ and heavier polymers are also formed. Accordingly, the alkylation product obtained can have the following composition:

TABLE I

| Component: | Percent by weight |
|---|---|
| Cumene | 94.0–99.0 |
| Alpha methyl styrene | 0–0.3 |
| Olefin polymers | 0.1–0.5 |
| Tertiary butyl benzene | 0–0.6 |
| Isobutyl benzene | 0–0.5 |
| Normal butyl benzene | 0–0.2 |
| Ethyl cumene | 0–0.3 |
| Diisopropyl benzene | 0.5–2.0 |
| Hexyl benzene | 0.1–0.3 |
| Triethyl benzene | 0–0.7 |
| Unidentified | 0.3–0.6 |

A particularly important use for cumene resides in the preparation of phenol and acetone. Thus cumene can be subjected to oxidation with a gas containing molecular oxygen at a temperature of about 30° to about 100° C. and a pressure of about 0.5 to about 50 pounds per square inch gauge for a time such that about 20 to about 30 percent by weight thereof is converted to cumene hydroperoxide, the entire oxidation mixture thus obtained, or only the cumene hydroperoxide in said mixture, is then treated with an acid catalyst, such as aqueous sulfuric acid having a concentration of about 10 to about 95 percent, to decompose the same to obtain a crude mixture containing phenol and acetone, and thereafter the crude mixture is subjected to separation and purification procedures to recover separately phenol and acetone.

A cumene product obtained from the reactor product upon distillation contains the following:

TABLE II

| Component: | Percent by weight |
|---|---|
| Cumene | 99.50–99.98 |
| Alpha methyl styrene | 0.00–0.15 |
| Olefin polymers | 0.01–0.15 |
| Tertiary butyl benzene | 0.00–0.10 |
| Isobutyl benezene | 0.00–0.05 |
| Normal butyl benzene | 0.00–0.05 |

The distilled cumene mixture defined above in Table II is either free of alpha methyl styrene or butyl benzenes, or, when the same are present, are present in such small amounts that they do not adversely affect the production of phenol or acetone therefrom using the reaction defined above. The olefin polymers, however, have a tendency to inhibit the oxidation of cumene to cumene hydroperoxide. Additionally, when the cumene hydroperoxide so produced is decomposed with sulfuric acid to obtain phenol and acetone, the olefins originally in admixture with the cumene have a tendency to react with the sulfuric acid to form alkyl sulfates and higher olefinic polymers, which will have to be removed from the system, since they constitute color bodies when they are present with phenol or acetone.

We have found that an impure cumene, as identified above, containing olefin polymers as its principal impurity and having an acid wash color in excess of about one and a bromide index in excess of about 50, can effectively be oxidized to a mixture containing cumene hydroperoxide and said cumene hydroperoxide can safely be decomposed using an acid catalyst, such as sulfuric acid, to obtain a mixture containing phenol and acetone if the cumene, prior to oxidation, is treated with a palladium catalyst on alumina ($Al_2O_3$) in the presence of hydrogen under selected temperature and pressure conditions. Under such conditions if alpha methyl styrene is present it is converted to cumene. The butyl benzenes, if present, we believe remain unaffected, but since, as noted, they would be present in small amounts their presence produces no adverse results in the production of phenols and acetone from cumene. Olefin polymers of the type herein present are believed to be somewhat resistant to hydrogenation, but under the conditions employed are in fact believed to be largely converted to the corresponding paraffins. The latter do not adversely affect the course of the oxidation described above or the decomposition of the cumene hydroperoxide. Surprisingly, while the conditions employed are sufficient to convert the olefin polymers to innocuous compounds they are selected to avoid any appreciable hydrogenation of cumene to isopropyl cyclohexane.

In order to obtain the desired results of this invention the reaction conditions must be carefully controlled. Thus, the temperature must be about 100° to about 300° F., preferably about 150° to about 200° F. Pressure must be about 50 to about 400 pounds per square inch gauge, preferably about 100 to about 200 pounds per square inch gauge. The amount of hydrogen required is low, from about 1.5 to about 15 standard cubic feet per barrel of impure cumene, but can be as low as about 0.5 or as high as about 150, or even higher, standard cubic feet per barrale of impure cumene. A space velocity (volume of impure cumene per volume of catalyst per hour) of about one to about eight, but preferably about two to about four, can be employed.

The catalyst employed must be palladium on alumina ($Al_2O_3$) wherein the amount of palladium on alumina can be from about 0.1 to about 1.0 percent by weight thereof, preferaby from about 0.3 to about 0.5 percent by weight thereof. We have found that the use of this catalyst in the defined procedure selectively hydrogenates substantially all of the olefin polymers admixed with the cumene but that such selective hydrogenation is not accompanied by any appreciable hydrogenation of the cumene itself. Additionally, since the palladium is employed on an alumina support, this facilitates regeneration of the palladium catalyst when required. This can be done, for example, by initially stripping volatile materials on the catalyst surface, which involves passing superheated steam at atmospheric pressure and about 900° F. for two hours over the catalyst surface. Then air is slowly added to the stream of steam until the amount of air amounts to about five percent by volume based on steam while maintaining the temperature at about 900° F. This is continued until there is no further generation of $CO_2$, which indicates that the catalyst surface is substantially free of organic deposits.

The process of this invention can further be illustrated by the following. In each of Runs Nos. 1 and 2 below there was charged to a reactor containing 300 cc. of catalyst over a period of 24 hours 42,000 and 14,000 grams, respectively, of an impure cumene stream analyzing as follows:

| Component | Weight Percent | |
|---|---|---|
| | Run No. 1 | Run No. 2 |
| Cumene | 99.89 | 99.89 |
| Olefin Polymer | 0.08 | 0.08 |
| Butyl Benzene | 0.02 | 0.02 |
| Alpha Methyl Styrene | 0.01 | 0.01 |

In each of Runs 3 and 4 below the reaction of Runs Nos. 1 and 2 was repeated, except that one cubic foot of catalyst was employed and the impure cumene stream charged contained 21 and 42 barrels of impure cumene, respectively analyzing as follows:

| Component | Weight Percent | |
|---|---|---|
| | Run No. 3 | Run No. 4 |
| Cumene | 99.94 | 99.98 |
| Olefin Polymer | 0.06 | 0.02 |
| Butyl Benzene | <0.01 | <0.01 |

In Runs Nos. 1 and 2 a palladium on alumina catalyst manufactured by Engelhard Industries, Inc., Newark, N.J. and identified as 0.5 percent palladium on ⅛″ alumina pellets, which analysis showed amounted to 0.5 percent by weight of palladium on alumina, was employed. In Runs Nos. 3 and 4 a chromium-promoted palladium on alumina catalyst manufactured by The Girdler Catalyst Company, Louisville, Ky., and identified as G–68, which analysis showed amounted to 0.5 percent by weight of palladium and 0.3 percent by weight chromium on alumina, was employed. The chromium on the latter catalyst does not serve any useful function herein, since its presence on such catalyst is merely to render the same sulfur resistant in cases wherein such need exists. The data obtained from these examples are tabulated below in Table III.

TABLE III

| Example | 1 | 2 | 3 | 4 |
|---|---|---|---|---|
| Temperature, °F | 200 | 150 | 130 | 140 |
| Space Velocity, Volume of Cumene Per Hour Per Volume Of Palladium Catalyst | 7 | 2.33 | 2.8 | 5.6 |
| Hydrogen, Standard Cubic Feet Per Barrel of Cumene | 13 | 13 | 3 | 1.5 |
| Pressure, Pounds Per Square Inch Gauge | 200 | 200 | 76 | 80 |
| Charge Properties: | | | | |
| Acid Wash Color, ASTM D-848 | 3 | 3 | 2 | 1+ |
| Bromine Index, ASTM D-1491 | 110 | 110 | 80 | 46 |
| Product Properties: | | | | |
| Acid Wash Color, ASTM D-848 | 1 | 1− | 1− | 1− |
| Bromine Index ASTM D-1491 | 48 | 44 | 25 | 25 |

The advantages of operating in accordance with our procedure is apparent from the above. The acid wash color indicates the presence of undesirable impurities in the cumene capable of reacting with sulfuric acid to form color bodies. Bromine index is a measure of unsaturated compounds that are present. An acceptable cumene for oxidation for eventual conversion to phenol and acetone, as defined above, must possess an acid wash color of one or lower and a bromine index of 50 or lower. The data in Table III show that the procedure employed herein is effective for such purpose.

Obviously, many modifications and variations of the invention, as hereinabove set forth, can be made without departing from the spirit and scope thereof, and therefore only such limitations should be imposed as are indicated in the appended claims.

We claim:

1. A process for purifying an impure cumene containing at least 99.50 percent by weight cumene and between 0.01 and 0.15 percent by weight olefin polymers having between six and ten carbon atoms as impurity and having an acid wash color in excess of about one and a bromine index in excess of about 50 which comprises contacting said cumene at a temperature of about 100° to about 300° F. in the presence of hydrogen with a catalyst comprising palladium on alumina.

2. A process for purifying an impure cumene containing at least 99.50 percent by weight cumene and between 0.01 and 0.15 percent by weight olefin polymers having between six and ten carbon atoms as impurity and having an acid wash color in excess of about one and a bromine index in excess of about 50 which comprises passing said cumene over a catalyst comprising palladium on alumina at a space velocity of about one to about eight in the presence of hydrogen while maintaining a temperature of about 100° to about 300° F. in the reaction zone.

3. A process for purifying an impure cumene containing at least 99.50 percent by weight cumene and between 0.01 and 0.15 percent by weight olefin polymers having between six and ten carbon atoms as impurity which comprises passing said cumene over a catalyst comprising palladium on alumina at a space velocity of about two to about four in the presence of hydrogen while maintaining a temperature of about 150° to about 200° F. in the reaction zone and thereafter recovering a cumene product having an acid wash color of one or less.

4. In a process wherein an impure cumene containing at least 99.50 percent by weight cumene and between 0.01 and 0.15 percent by weight olefin polymers having between six and ten carbon atoms as impurity and having an acid wash color in excess of about one and a bromine index in excess of about 50 is oxidized with molecular oxygen to obtain cumene hydroperoxide and said cumene hydroperoxide is decomposed with an acid catalyst to obtain phenol and acetone, the improvement which comprises passing said cumene, prior to said oxidation, over a catalyst comprising palladium on alumina at a space velocity of about one to about eight in the presence of hydrogen while maintaining the temperature in the reaction zone in a range of about 100° to about 300° F.

5. In a process wherein an impure cumene containing at least 99.50 percent by weight cumene and between 0.01 and 0.15 percent by wegiht olefin polymers having between six and ten carbon atoms as impurity and having an acid wash color in excess of about one and a bromine index in excess of about 50 is oxidized with molecular oxygen to obtain cumene hydroperoxide and said cumene hydroperoxide is decomposed with an acid catalyst to obtain phenol and acetone, the improvement which comprises passing said cumene, prior to said oxidation, over a catalyst comprising palladium on alumina at a space velocity of about one to about eight in the presence of hydrogen while maintaining the temperature in the reaction zone in a range of about 150° to about 200° F.

6. In a process wherein an impure cumene containing at least 99.50 percent by weight cumene and between 0.01 and 0.15 percent by weight olefin polymers having between six and ten carbon atoms as impurity and having an acid wash color in excess of about one and a bromine index in excess of about 50 is oxidized with molecular oxygen to obtain cumene hydroperoxide and said cumene hydroperoxide is decomposed with an acid catalyst to obtain phenol and acetone, the improvement which comprises passing said cumene, prior to said oxidation, over a catalyst comprising palladium on alumina wherein the amount of palladium on said alumina amounts to about 0.3 to about 0.5 percent by weight at a space velocity of about one to about eight in the presence of hydrogen while maintaining the temperature in the reaction zone in a range of about 150° to about 200° F.

7. In a process wherein an impure cumene containing at least 99.50 percent by weight cumene and between 0.01 and 0.15 percent by weight olefin polymers having between six and ten carbon atoms as impurity and having an acid wash color in excess of about one and a bromine index in excess of about 50 is oxidized with molecular oxygen to obtain cumene hydroperoxide and said cumene hydroperoxide is decomposed with an acid catalyst to obtain phenol and acetone, the improvement which comprises passing said cumene, prior to said oxidation, over a catalyst comprising palladium on alumina at a space velocity of about two to about four in the presence of about 1.5 to about 15 standard cubic feet of hydrogen per barrel of said cumene while maintaining the temperature in the reaction zone in a range of about 150° to about 200° F.

8. In a process wherein an impure cumene containing at least 99.50 percent by weight cumene and between 0.01 and 0.15 percent by weight olefin polymers having between six and ten carbon atoms as impurity and having an acid wash color in excess of about one and a bromine index in excess of about 50 is oxidized with molecular oxygen to obtain cumene hydroperoxide and said cumene hydroperoxide is decomposed with an acid catalyst to obtain phenol and acetone, the improvement which comprises passing said cumene, prior to said oxidation, over a catalyst comprising palladium on alumina at a space velocity of about two to about four in the presence of about 1.5 to about 15 standard cubic feet of hydrogen per barrel of said cumene while maintaining the temperature in the reaction zone in a range of about 150° to about 200° F. and a pressure of about 50 to about 400 pounds per square inch gauge.

References Cited

UNITED STATES PATENTS

| | | | |
|---|---|---|---|
| 2,953,612 | 9/1960 | Haxton et al. | 260—683.9 |
| 3,268,608 | 8/1966 | De Rosset | 260—667 |

LEON ZITVER, *Primary Examiner.*

M. JACOB, *Assistant Examiner.*